Nov. 18, 1969   R. S. BRACKEN   3,479,173
GLASSWARE FORMING MACHINE
Filed April 29, 1966   2 Sheets-Sheet 1
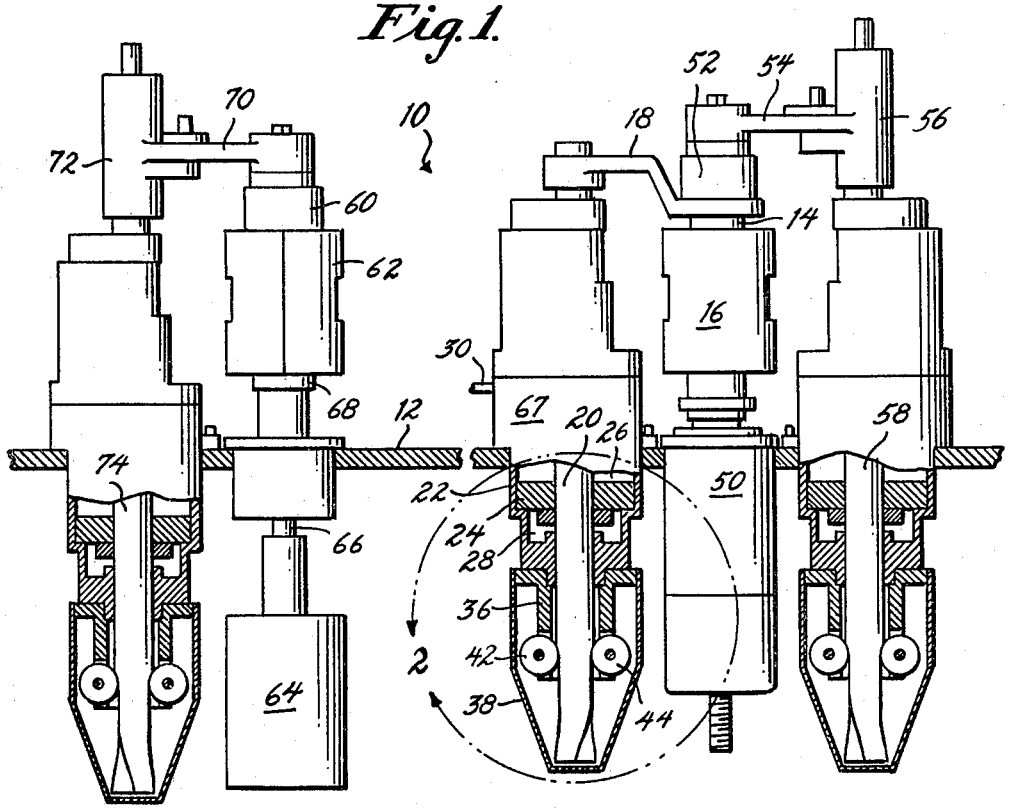
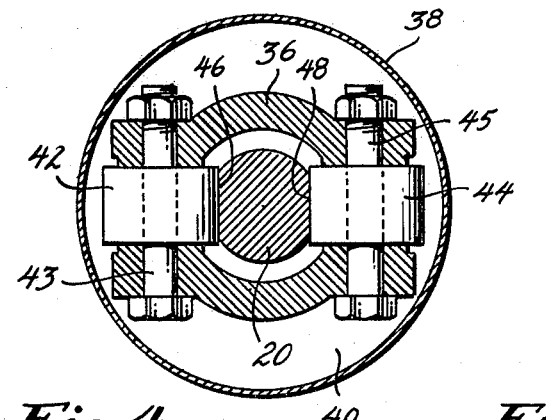
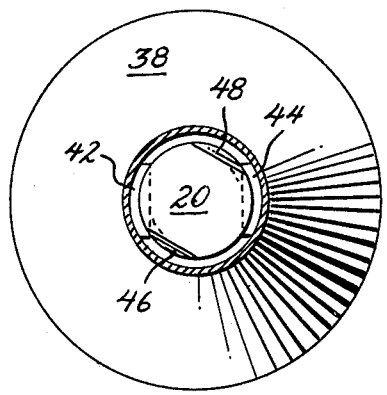
INVENTOR.
ROBERT S. BRACKEN
BY
Seidel & Gonda
ATTORNEYS.

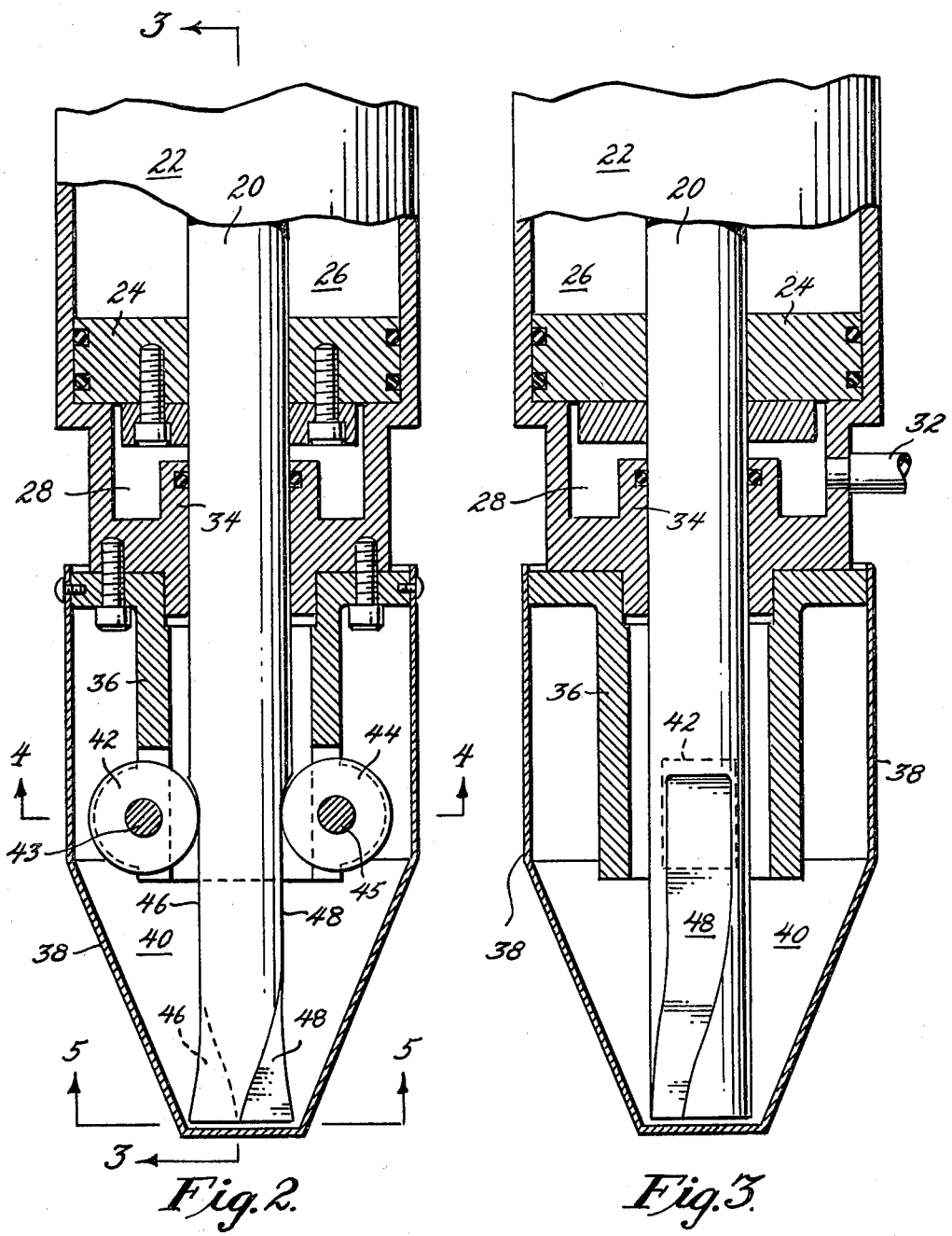

United States Patent Office 3,479,173
Patented Nov. 18, 1969

3,479,173
GLASSWARE FORMING MACHINE
Robert S. Bracken, Vineland, N.J., assignor to Maul Bros. Inc., Millville, N.J., a corporation of New Jersey
Filed Apr. 29, 1966, Ser. No. 547,075
Int. Cl. C03b 9/40, 11/16
U.S. Cl. 65—229     9 Claims

ABSTRACT OF THE DISCLOSURE

A piston rod connected to a support arm is caused to rotate as it reciprocates by means of at least one helical cam surface on the outer periphery of the piston rod cooperating with a cam follower supported by a surrounding casing. The support arm may be a baffle arm, funnel arm or blowhead arm.

---

This invention relates to a glassware forming machine, and more particularly to a glassware forming machine of the individual section type for making hollow glassware such as bottles and the like.

In an individual section glassware forming machine such as that disclosed in Ingle Patent 1,911,119, there are at least three arms disposed in a horizontal position which must reciprocate up and down and turn during such reciprocation. The present invention is particularly directed to the mechanism for effecting such turning movement. The devices utilized heretofore for effecting such turning movement, such as that disclosed in the above-mentioned Ingle patent or in Rowe Patent 2,645,059 have not been entirely satisfactory.

As disclosed in the above-mentioned patents, the turning movement effected by the devices disclosed therein includes a pin extending radially outwardly from a piston rod supporting one of the arms. The pin supports a cam follower which follows a cam track in a sleeve surrounding the piston rod. Heretofore, the problems associated with the ability of such devices to perform satisfactorily have been solved by the metallurgical approach such as by using harder and stronger materials, or the mechanical approach of increasing diameters of bearing surfaces.

The industry has been able to live with the inherent defects in the turning mechanism used heretofore when the glassware was small. Recently, the size of the glassware has increased to the point where fatigue due to torque and speed requires the pin supporting the cam follower to be replaced as often as once a week. When such pin is being replaced, there is substantial down time on the machine and a substantial amount of production is lost. As the size of the glassware increases, the size of the supporting arm and components associated therewith increase.

In a double gob single section machine wherein the cylinders are 4⅛ inches on center, the weight of the supporting arms was approximately 35 pounds. On recent machines, the centers are spaced 6 inches apart and the arms now weigh approximately 45 pounds. With the centers spaced 4⅛ inches apart, approximately 95 bottles having a diameter of 3⅝ inches be made per minute. In a machine having 6 inch centers, bottles having a diameter of 4⅛ inches can be made at a rate of approximately 160 per minute. Thus, it will be noted that the weight of the arm has increased approximately 30% and that the speed has increased by approximately 70%. Hence, the original design concept is no longer satisfactory. I have solved the fatigue problem at these increased weight and speeds by a novel mechanism for effecting the turning movement which is simple, easy to manufacture, reliable, and easy to maintain.

In accordance with the present invention, the piston rod for each of the various arms is provided with a cam surface on its outer periphery. Preferably, a pair of oppositely disposed cam surfaces are provided on each piston rod. Rotatable cam followers are supported about a stationary axis for contact with the cam surface in causing the piston rod to rotate through a predetermined arc as a function of the vertical movement of the piston rod. Since the present invention is applicable to single or double gob machines, the invention will be described in the simplest form in connection with a single gob machine.

It is an object of the present invention to provide a glassware forming machine wherein heavier support arms and increased production rates may be attained without fatigue failure of the mechanism for effecting a turning movement on the arms.

It is another object of the present invention to provide a turning mechanism for use in an individual section glassware forming machine which is simple, reliable and easy to maintain.

It is another object of the present invention to provide a turning mechanism for a piston rod wherein a cam surface is provided directly on the piston rod.

Other objects will appear hereinafter.

For the purpose of illustrating the invention, there is shown in the drawings a form which is presently preferred; it being understood, however, that this invention is not limited to the precise arrangements and instrumentalities shown.

FIGURE 1 is a diagrammatic elevation view, partly in section, of a portion of an individual section glassware forming machine.

FIGURE 2 is an enlarged detail view of the circled portion in FIGURE 1.

FIGURE 3 is a sectional view taken along the line 3—3 of FIGURE 2.

FIGURE 4 is a sectional view taken along the line 4—4 in FIGURE 2.

FIGURE 5 is a sectional view taken along the line 5—5 in FIGURE 2.

Referring to the drawing in detail, wherein like numerals indicate like elements, there is shown a portion of an individual section glassware forming machine designated generally as 10. The portion of machine 10 illustrated in FIGURE 1 corresponds generally to the portion of the diagrammatic illustration in FIGURE 4 of said Ingle Patent 1,911,119.

The machine 10 includes a frame designated generally as 12. A funnel 14 is supported by a funnel arm 18 above a mold 16. Arm 18 is supported by an adjustable collar or other device at the upper end of a piston rod 20. Piston rod 20 extends from and to opposite ends of a cylinder 22 supported by the frame 12. A piston 24 is secured to the piston rod 20 within the cylinder 22.

As shown more clearly in FIGURE 2, the piston 24 divides the interior of cylinder 22 into an upper chamber 26 and a lower chamber 28. A conduit 30 is provided to introduce a motive fluid such as pressurized air into chamber 26. A similar conduit 32 is provided for introducing a similar fluid into chamber 28. See FIGURE 3.

The lower wall of the cylinder 22 is provided with an axially disposed boss 34 in sealing engagement with the outer periphery of piston rod 20. A sleeve 36 is axially secured to said last mentioned wall be bolts extending through a flange on the sleeve as shown more clearly in FIGURE 2. A casing 38 which is cup-shaped in cross section has its upper periphery removably and sealingly coupled to the flange on said sleeve 36. The chamber 40 within casing 38 is adapted to be substantially filled with a lubricating oil.

Axially directed slots are provided on opposite sides of the sleeve 36 between a pair of ears on each side. One pair of ears cooperates with a bolt 43 to support a cam follower 42. The other pair of ears cooperates with bolt 45 to support cam follower 44.

The outer periphery of piston rod 20 is provided with oppositely disposed cam surfaces 46 and 48. Cam follower 42 is in rolling contact with cam surface 46. Cam follower 44 is in rolling contact with cam surface 48. The cam surfaces 46 and 48 are not axially disposed but rather turned through an arc of about 55° over the length of the cam surfaces as will be apparent from FIGURE 5. By using two cam surfaces oppositely disposed and a pair of oppositely disposed cam followers, increased stability during reciprocation of the piston rod 20 is attained without the necessity of elongated bearing sleeves and the like while at the same time minimizing bending stresses which would contribute to an early fatigue failure of the piston rod 20.

Referring to FIGURE 1, there will be noted that a conventional plunger mechanism 50 may be supported by the frame 12 for cooperation with the mold 16 to effect the desired forming of the parison. A baffle 52 is supported above the mold 16 by a baffle arm 54. Baffle arm 54 is connected to a collar 56 adjustably connected to the upper end of a piston rod 58. Piston rod 58 likewise extends from opposite ends of a cylinder wherein fluid pressure may be introduced above or below a piston to effect reciprocation of the piston rod 58. Likewise, an identical turning mechanism as described above is supported by the cylinder to effect a turning movement on the baffle arm 54 as the piston rod 58 reciprocates. In view of the above description with respect to piston rod 20, a more detailed explanation for the elements cooperating with piston rod 58 is not deemed necessary.

As shown on the left-hand side of FIGURE 1, a blowhead 60 is provided above a split blow mold 62. A cylinder 64 is supported in depending relation to the frame 12 and is associated with a piston rod 66. Piston rod 66 is adapted to move a bottom plate 68 for the split mold 62 up and down in a predetermined sequence. The blowhead 60 is supported by a blowhead arm 70 attached to a collar 72. The collar 72 is adjustably connected to the upper end of the piston rod 74. Piston rod 74 is associated with an identical cylinder and turning mechanism as described above.

It will be apparent to those skilled in the art that FIGURE 1 is not a true straight line sectional view. Thus, the longitudinal axes of the piston rods 20, 58 and 74 form a triangle rather than being in a straight line. For purposes of illustration, the various devices such as the invert mechanism, mold holders, tongs, and the like have not been shown since they would unnecessarily complicate the illustration of the novel features of the present invention.

Those skilled in the art of individual section glassware forming machines will readily understand the operation. Thus, the operation of the present machine is identical with those used heretofore and described in detail in the above-mentioned Ingle patent except as will be made clear hereinafter.

The funnel 14 is used to guide the parison into the mold cavity of mold 16. Settle blowing pressure is applied to the mold 16 to pack parison therein for forming the finish of the glassware by means of baffle 52. After the parison has been shaped within mold 16 by a plunger mechanism associated with cylinder 50, the piston rods 20 and 58 are sequentially elevated and cause to rotate through an arc by the turning mechanisms described above. Thereafter, the invert mechanism may transfer the partially shaped parison into the split mold 62 for a blowing operation to finish the glassware. When the parison is transferred to mold 62, the piston rod 74 is in an elevated position. When the piston rod 74 descends, it rotates through an arc so as to place the blowhead 60 over the mold 62 as illustrated in FIGURE 1.

Each of the piston rods 20, 58 and 74 are connected to pistons which are subjected to a motive fluid such as pressurized air on opposite faces. Thus, pressurized air or a hydraulic fluid is preferably used to raise and lower the piston rods. This provides more accurate control over the position of the blowhead arm and baffle arm. Accurate control over the funnel arm is not as critical and therefore a spring could be used in chamber 28 in place of pressurized fluid introduced thereinto by way of conduit 32. The overall dimensions of the various mechanism described above are preferably compatible so that they may be interchanged with the existing mechanisms in machines already in operation.

I claim:

1. In a glassware forming machine comprising a piston rod extending into a cylinder, a piston in the cylinder connected to said rod, a support arm connected to the piston rod outside of the cylinder and extending in a generally radial direction from the piston rod for vertical and rotative movement with the piston rod, means for introducing fluid into the cylinder for causing vertical movement of the piston rod along its axis, the improvement comprising helical cam surfaces on opposite sides of the outer periphery of the portion of the piston rod outside of said cylinder, a separate rotatable cam follower in rolling contact with each cam surface on said piston rod to cause the piston rod and its support arm to rotate about the longitudinal axis of said rod during movement of said rod along its axis and means for supporting said cam followers to insure stability during movement of said rod.

2. In a machine in accordance with claim 1 wherein said cam followers are rollers mounted for rotation about an axis transverse to the longitudinal axis of said piston rod, said rollers being supported from and below said cylinder, and said rod being of sufficient length so as to extend from each end of said cylinder, and said arm being connected to said rod at a location on the rod above said cylinder.

3. In a machine in accordance with claim 1 wherein said arm is a baffle arm for supporting a baffle.

4. In a machine in accordance with claim 1 wherein said arm is a funnel arm for supporting a funnel.

5. In a machine in accordance with claim 1 wherein said arm is a blowhead arm for supporting a blowhead.

6. In a machine in accordance with claim 1 wherein said cam follower supporting means includes a sleeve secured to one end of said cylinder, said sleeve surrounding said piston rod and supporting the cam followers on opposite sides thereof, each cam follower being a roller mounted for rotation about an axis transverse to the longitudinal axis of said piston rod, and a casing surrounding said sleeve and rollers and containing a lubricant therein.

7. In a glassware forming machine of the individual section type having a funnel arm connected to a first piston rod, a baffle arm connected to a second piston rod, a blowhead arm connected to a third piston rod, a mechanism associated with each piston rod for causing the piston rod to reciprocate along its longitudinal axis and turn through a predetermined arc during such reciprocation, the improvement comprising a helical cam surface at the lower end of each piston rod on opposite sides thereof, a separate rotatable cam follower rollingly engaging each cam surface, each cam follower being supported for rotation about an axis transverse to the longitudinal axis of its associated piston rod, to insure stability during reciprocation of said rod, and a casing surrounding the lower end of each piston rod, each casing containing a lubricant.

8. In a machine in accordance with claim 7 including a sleeve supported within each casing, the cam followers in each casing being supported from opposite sides of the sleeve associated therewith.

9. In a machine in accordance with claim 7 wherein a piston is secured to each piston rod said piston rods being solid for the entire length below the place where the piston is attached thereto.

References Cited

UNITED STATES PATENTS

| | | | |
|---|---|---|---|
| 3,329,492 | 7/1967 | Kinsley | 65—361 X |
| 1,911,119 | 5/1933 | Ingle | 65—355 X |
| 2,811,814 | 11/1957 | Winder | 65—361 |
| 3,338,699 | 8/1967 | Colchagoff et al. | 65—361 |

S. LEON BASHORE, Primary Examiner

SAUL R. FRIEDMAN, Assistant Examiner

U.S. Cl. X.R.

65—170, 260, 316, 362